3,197,445
POLYETHYLENE OXALATE PROCESS
Warren K. Cline, Hamden, Conn., assignor to Olin Mathieson Chemical Corporation, New Haven, Conn., a corporation of Virginia
No Drawing. Filed July 23, 1962, Ser. No. 211,870
3 Claims. (Cl. 260—78.4)

This invention relates to a novel polymerization process, and more particularly it relates to an improved process for preparing polyethylene oxalate.

Previously Carothers et al. have disclosed the preparation of polyethylene oxalate in Journ. Am. Chem. Soc., 52, 3292–3300 (1930). The polymer described therein was obtained by heating ethylene glycol and ethyl oxalate. After fractional crystallization of the polymer, a small portion of a higher molecular weight fraction having a melting point of 172° C. was isolated. This fraction was characterized as a white dusty powder, and no mention was made of any film- and fiber-forming properties.

More recently Batzer and Lang, Makromol. Chem. 15, 211 (1955) have prepared film and fibers from polyesters derived from oxalic acid and diols such as 1,6-hexanediol and 1,7-heptanediol. Although polyethylene oxalate was disclosed in this reference, there was no indication that it had film- and fiber-forming characteristics. It was apparent that the preparation of polyethylene oxalate by condensation polymerization resulted in a polymer of low molecular weight having inadequate physical properties for film- and fiber-forming.

There are several disadvantages associated with the prior method of preparing the polyethylene oxalate polymer. The condensation polymerization is tedious and time consuming, and it is necessary to remove either water or alcohol from the reaction mixture during the process. Furthermore these polymerizations are usually performed in the presence of an acid catalyst such as p-tuluenesulfonic acid and calcium and zinc acetates. Although the use of these catalysts considerably accelerated the condensation, there are undesirable effects resulting from the use of such catalysts. The catalysts appear to dehydrate ethylene glycol to acetaldehyde, and this material has been identified in the distillate obtained from a polymerization using an acid catalyst. It has been demonstrated that dehydration of boiling ethylene glycol is fairly rapid in the presence of p-toluenesulfonic acid and that smaller quantities of aldehyde are formed in the presence of both calcium and zinc acetates. This side reaction undoubtedly upsets the stoichiometry of the polymerization and prevents the production of the high molecular weight polymer which is necessary for film- and fiber-forming material. Thus the production of a high molecular weight polyethylene oxalate by means of condensation polymerization has been unsuccessful. It became apparent that a more efficient polymerization process would be desirable.

Therefore the principal object of this invention was to provide a simple direct method for the preparation of a high molecular weight polyethylene oxalate.

Another object of this invention was to provide a process for preparing polyethylene oxalate having film- and fiber-forming characteristics.

Another object of this invention was to provide a process for the rapid polymerization of polyethylene oxalate.

Still another object of this invention was to provide a process for the preparation of polyethylene oxalate which would be free of undesirable side reactions.

Other objects are discussed in or will be apparent from the following discussion.

These objects have been accomplished in accordance with this invention. It has been found that monomeric cyclic ethylene oxalate (1,4 dioxane-2,3-dione) can be polymerized in the presence of selected catalysts to a high molecular weigh polymer. The polymerization occurs very rapidly under specified conditions and is not accompanied by undesirable side reactions. Polyethylene oxalate samples have been prepared which are characterized by a higher melting point than those previously recorded in the literature. Fibers can be drawn from the polymeric melt, and these fibers could be oriented by cold drawing to obtain strong tough fibers. Clear, flexible films can also be prepared from the high molecular weight polymer. The polymerization process does not require the use of specialized equipment.

The following examples are illustrative of the preparation of polyethylene oxalate in accordance with the teachings of this invention. The first example describes the preparation of the cyclic monomer by depolymerization of a low molecular weight prepolymer of polyethylene oxalate. The remaining examples describe the polymerization of the cyclic monomer to a high molecular weight polymer. It is to be understood that these examples are not to be considered as limiting the scope of this invention, but are illustrative only, as obvious modifications will be apparent to those skilled in the art.

*Example 1*

A depolymerization apparatus was constructed which consisted of a short-path distilling flask. A three inch piece of glass tubing having an inside diameter of 20 mm. was closed at one end and sealed at the other end at a 75° angle to a 24/40 ground glass joint. In operation, the closed end of this retort containing the prepolymer was heated in a wax bath with the outlet tube pointing slightly downward. It was connected to a vacuum pump through a two-necked flask which served as a distillation receiver.

Into this apparatus was charged 18.9 g. of a yellow, waxy prepolymer prepared by condensation of diethyl oxalate with two moles of ethylene glycol using sodium as a catalyst. The depolymerization was run at 191–216° C. (bath temperature) and 0.03 to 0.4 mm. of Hg pressure. The reaction was complete in about six hours. The total yield of cyclic ethylene oxalate, M.P. 144–8° C., was 15.8 g. or 83.5% based on prepolymer.

The monomer could be recrystallized from a mixture of acetone and ether, but this resulted in very little purification. Distillation is not a satisfactory method of purification because of the high volatility of the solid near its melting point. Sublimation was found to be the most effective method of purification. Thus, when monomer, M.P. 144–8° C. was resublimed at 190–210° C. (bath temperature) and 1-2 mm. of Hg, a pure white product M.P. 148–51° C. was obtained.

*Example 2*

Into a test tube equipped with a side arm and with a capillary tube inserted through a rubber stopper was placed 5.0 g. of purified cyclic ethylene oxalate. The test tube was placed in a wax bath at 165° C. When all of the monomer had melted, 0.0015 g. of antimony trifluoride was added. Nitrogen was bubbled in through the capillary tube and heating continued at 165–179° C. for 55 minutes. The melt viscosity noticeably increased within 25 minutes as indicated by the rate at which gas bubbles rose through the liquid, and at the end of the polymerization the bubbles were barely moving. The very viscous melt was clear and colorless but filled with many small bubbles. Fibers were drawn from the melt by inserting and withdrawing a glass rod. These fibers were colorless, flexible and could be oriented by cold drawing. The cold-drawn fibers were extremely strong and tough. The polymer had a melting point of 178–180° C.

Example 3

The same apparatus which was used in Example 2 was again utilized. Cyclic ethylene oxalate (5.0 g.), which had been purified by sublimation, was melted by using a wax bath maintained at 165° C. When the monomer had melted, 0.0015 g. of antimony trifluoride was added to the tube. The material was then heated in a nitrogen atmosphere at 180–184° C. for 30 minutes. The resultant viscous melt was clear and colorless. Fibers could be drawn from the melt and were very tough. These fibers were also orientable by stretching in the cold. The polymer had a melting point of 177–179° C.

Example 4

Purified cyclic ethylene oxalate (5.0 g.) was placed in the apparatus of Example 2 and melted at 165° C. Then 0.00015 g. of stannic chloride was added to the tube. The material was heated under a nitrogen atmosphere at 205° C. for 15 minutets. A slightly cloudy colorless viscous melt was obtained and this material had a melting point of 176–179° C. Orientable fibers which were very tough could be drawn from this melt.

As shown in Example 1, a high yield of cyclic ethylene oxalate monomer can be readily obtained by the depolymerization of a low molecular weight prepolymer. This monomer can be easily purified by sublimation, and best results have been obtained when purified monomer is used in the polymerization process.

It has been found that the polymerizations can be performed satisfactorily at a fairly wide temperature range. For example, polymers having excellent physical properties have been obtained using temperatures of from about 165° to about 210° C. However best results have been obtained at a temperature range of 175° to 190° C., and this is the preferred polymerization temperature.

Polymerizations performed in accordance with the process described herein are very rapid and are invariably completed in a period of about three hours or less. The use of a stannic chloride catalyst, as shown in Example 4, appears to provide an especially rapid polymerization, and a high molecular weight polymer was prepared in a fifteen minute period. The rapidity of these polymerizations is a novel feature and should be contrasted with the much longer periods required for the condensation of ethylene glycol with oxalic acid or diethyl oxalate.

It has been found that catalysts of the so-called Lewis acid type are preferentially used in the herein described polymerizations. For example, these preferred catalysts include aluminum chloride, zinc chloride, antimony trifluoride, titanium tetrachloride, stannic chloride and ferric chloride. Other catalysts which have been successfully utilized in the process are alkali metals, alkali metal alkoxides and metal oxides including antimony trioxide and lead oxide. Zinc acetate, calcium acetate and alkyl titanates such as tetrabutyl titanates can also be successfully employed in this polymerization process.

In general the catalysts can be used advantageously in amounts of from about 0.003% to about 0.25% based on weight of monomer charge. There does not appear to be any significant improvement in process conditions if greater amounts of the catalyst are employed. It has been found that preferred catalyst concentration should be about 0.003% to about 0.03% of monomer charge.

Although the polymers can be successfully prepared in the absence of a nitrogen atmosphere, it is preferred that such conditions be employed during the polymerization in order to eliminate traces of moisture and possible side reactions.

The monomeric cyclic ethylene oxalate can also be polymerized in ethylene carbonate solution using the above described catalysts. The solid polymer precipitates from the solution and can be isolated by filtration accompanied with alcohol washing. However polymers prepared in this manner were characterized by lower melting points and unsatisfactory physical properties.

Polymers prepared in accordance with this invention can be used in the production of clear, colorless strong films. For example, the polymers prepared in Examples 2, 3 and 4 have been converted into such films using the following procedure. Small quantities of polymers were pressed between the platens of a hydraulic press heated to 360–380° F. at 2000–5000 p.s.i. After rapid quenching, clear films were obtained in each case.

The polymers prepared in accordance with this invention are insoluble in any of the commonly used solvents, and it has not been possible to determine the molecular weight of these polymers. However the fact that these polymers can be drawn into strong fibers and pressed into clear transparent tough films indicates the value of this process in preparing a high molecular weight polymer as contrasted to the polymers previously prepared by condensation polymerization techniques.

What is claimed is:

1. A method of preparing polyethylene oxalate having film- and fiber-forming properties which comprises heating cyclic ethylene oxalate at a temperature of about 165° C. to about 210° C. in a nitrogen atmosphere with a catalyst selected from the group consisting of aluminum chloride, zinc chloride, antimony trifluoride, titanium tetrachloride, ferric chloride, stannic chloride, zinc acetate, calcium acetate, antimony trioxide, lead oxide and tetrabutyl titanate, said catalyst being used in an amount of from about 0.003% to about 0.03% by weight based on oxalate content.

2. The method of claim 1 wherein antimony trifluoride is utilized as the catalyst.

3. The method of claim 1 wherein stannic chloride is utilized as the catalyst.

References Cited by the Examiner

UNITED STATES PATENTS 2,951,828  9/60  Zeile et al. _____ 260—78.3

OTHER REFERENCES

Hall et al.: Journal of the American Chemical Society, December 1958, pages 6409–12.

JOSEPH L. SCHOFER, *Primary Examiner.*

DONALD E. CZAJA, *Examiner.*